United States Patent [19]
Aoki et al.

[11] 4,329,032
[45] May 11, 1982

[54] AUTOMATIC FOCUS INDICATING DEVICE FOR CAMERA
[75] Inventors: Harumi Aoki, Kiyose; Yoshio Sawada, Tokyo, both of Japan
[73] Assignee: Asahi Kogaku Kogyo Kabushiki Kaisha, Tokyo, Japan
[21] Appl. No.: 117,338
[22] Filed: Jan. 31, 1980
[30] Foreign Application Priority Data
Feb. 16, 1979 [JP] Japan .................................. 54-16949
[51] Int. Cl.³ ............................................. G03B 13/18
[52] U.S. Cl. ...................................... 354/25; 354/60 E
[58] Field of Search ..................... 354/25, 60 E, 60 L, 354/198, 289, 25 A, 25 P, 25 N, 31 F; 352/140; 355/56; 250/201, 204

[56] References Cited
U.S. PATENT DOCUMENTS
3,743,416 7/1973 Widmer et al. ....................... 355/56

4,117,325 9/1978 Holle et al. ........................ 354/25 X

Primary Examiner—L. T. Hix
Assistant Examiner—William B. Perkey
Attorney, Agent, or Firm—Sughrue, Mion, Zinn, Macpeak and Seas

[57] ABSTRACT

An automatic focus indicating device especially adapted for use with a single lens reflex camera in which a contrast signal is produced by scanning the image of an object being viewed through the photographing lens of the camera. This signal is converted into an indication signal which may be either an audio or a visual signal. As the lens is moved to positions near the focus point, the indicating device is activated to a first mode. As the lens is set precisely upon the point of focus, the indicating device operates in a second mode. In this manner, the camera is well adapted for both hand-held and fixed position usage.

4 Claims, 9 Drawing Figures

AUTOMATIC FOCUS INDICATING DEVICE FOR CAMERA

BACKGROUND OF THE INVENTION

The present invention relates to an automatic focus detecting device in which at the position of focus a focus signal indicative of the fact that the image of an intended object is correctly focused by a photographing lens is produced.

A variety of automatic focusing cameras have been proposed in the field of optical image forming systems in which a correct focus position is automatically detected so that the lens may be moved to the focus position. However, to date, no automatic focusing single-lens reflex camera has been put in practical commercial use. One of the important reasons for this is that a single-lens reflex camera is a high grade camera which is extremely severe in its requirements for focus detecting accuracy. In addition, as the lens of the single-lens reflex camera is relatively heavy, the lens driving mechanism is necessarily large. Furthermore, in order to stop the photographing lens at the focus position, it is necessary to provide a processing circuit which decides whether the lens is currently positioned in front of the focus position or behind it. The required processing circuit for performing this function is rather intricate. These factors make it difficult to manufacture automatic focusing single-lens cameras reflex.

A focus detecting technique is also known in the art in which, similar to a double-image coincidence type range-finder, the amount of relative shift between two optical images is electrically detected. Furthermore, a focus detecting technique is also known in the art in which contrast information of the image of an object to be photographed is extracted and the maximum value of the contrast signal thereof is detected.

The latter method utilizes the fact the optical intensity or power spectrum of each spatial frequency of the image of an object to be photographed becomes a maximum at the time of focalization. More specifically, with this technique a position-series scanning output signal representative of the brightness distribution of the image is obtained by mechanically or electrically scanning the image with a photoelectric conversion element and the signal thus obtained is differentiated to extract high frequency components, namely, the contrast information. After the differentiation signal has been converted into an absolute value waveform, the peak value of the absolute value waveform in a single scanning period is extracted and is employed as a focus signal.

A so-called "automatic focusing camera" can be constructed in which the photographing lens is automatically driven in accordance with the above-described focus signal. In addition, if a signal indicative of the focus position is utilized, then it is also possible to provide an automatic focus indicating device in which a light emitting element such as a lamp is turned on at the position of focus.

Recently, a technique has been proposed in which a self-scanning type photoelectric conversion element is employed as the scanning means. The use of such a self-scanning type photoelectric conversion element makes the scanning section compact. Therefore, the focus indicating device according to this technique can be readily incorporated into the design of a single-lens reflex camera. The signal provided by the self-scanning type photoelectric conversion element becomes a maximum at the position of focus. However, there may be more than one peak value due to the presence of multiple objects within the view of the photographing lens. Therefore, in order to stop the photographing lens at the focus position, it is required to provide some means for deciding whether a peak value is the true maximum or not. For this purpose, heretofore either two photoelectric conversion elements were disposed on the optical axis on either side of the focal plane or a memory circuit was employed for comparison of signals which were provided for two lens extension positions.

Efforts have been made to detect the correct focus position with high accuracy and to extract a single level digital signal which accurately indicates the focus position. However, where an automatic focus indicating device in which a light emitting element which is operated at the position of focus is built into a camera, indication of the focus position with a focus signal of extremely high accuracy leads to other difficulties. That is, pictures are often taken with a camera held in the hands of the photographer. In this case the camera is liable to be shaken by the photographer's hands as a result of which it is rather difficult to precisely focus the lens on the object. Therefore, if the focus signal of extremely high indication accuracy is used, then the display of the signal may turn on and off making it difficult for the photographer to use the camera properly. On the other hand, for pictures taken by a camera which is fixed in position, a high focus indication accuracy is desirable. These two contradictory conditions affect high grade cameras such as for instance single-lens reflex cameras quite significantly. This is an important reason why it is difficult to manufacture an automatic focus indicating camera.

Accordingly, an object of this invention is to provide an automatic focus indicating device in which all of the above-described difficulties have been eliminated and in which a focus, signal having a high focus indication accuracy when a camera is fixed in position but in which the focus signal is not so high in focus accuracy when the camera is held by hand.

An automatic focus indicating camera utilizing the device according to the invention has significant merits in that the focalization position can be readily detected even when pictures are taken with the camera held by hand, and, if the camera is fixed in position, then focalization indication is carried out with high accuracy.

Another object of the invention is to provide a simple focus indicating device in which the contrast signal is converted directly into a sound signal without using an intricate lens driving mechanism so that the position of the photographing lens where the desired peak value becomes a maximum is detected by listening to variations in the frequency or amplitude of the sound signal. The device positively utilizes the characteristic of the sense of hearing with which it is possible to detect extremely small sound variations and the highest frequency of the highest amplitude in such sound variations. Thus, the essential feature of the device according to the invention resides in that it can satisfy the severe conditions of focus detection accuracy which are required for a single-lens reflex camera.

SUMMARY OF THE INVENTION

These, as well as other objects of the invention, are met by an automatic focus indicating device for a camera including a photoelectric type focalization signal detecting means which operates in response to an image of an object to be photographed for producing an electrical signal which reaches a maximum value at a position of focus of a photographing lens of the camera, display control means for producing a focus signal in response to the electrical signal when the photographing lens is substantially at a focus position, and display means operating in response to the focus signal wherein a display condition of the display means changes in accordance with the magnitude of the focus signal in such a manner that the display means is activated in a first mode to indicate that the photographing lens is within a predetermined range of the focus position and wherein the display means operates in a second mode to indicate that the photographing lens is at the focus position. The display means may be a light emitting element the brightness of which is controlled by the focus signal. Otherwise, the display means may be a sound producing element such as a sound transducer with at least one of the frequency and amplitude of the sound produced by the sound producing element being controlled by the focus signal. The second mode may be either a zero or minimum frequency of sound or a maximum frequency of sound in this case.

Yet further, these and other objects of the invention may be met by providing a focus indicating device for a camera including a photoelectric conversion element for scanning the image of an object to be photographed for producing a position-series signal representive of the brightness distribution of the image, a contrast detecting circuit for extracting a brightness signal at a high spatial frequency range, the brightness signal representing a contrast property of the image, circuit means for converting output variations of the contrast signal into frequency variations, and a sound producing means operating in response to the circuit means wherein the frequency of sound produced by the sound producing means is at a peak value at the position of focus of a photographing lens of the camera. The amplitude of the sound produced may be at a maximum at the position of focus. Otherwise, the peak value of the frequency of the sound may be either a minimum or maximum as desired.

DESCRIPTION OF THE PREFERRED EMBODIMENTS

Figure 1A:
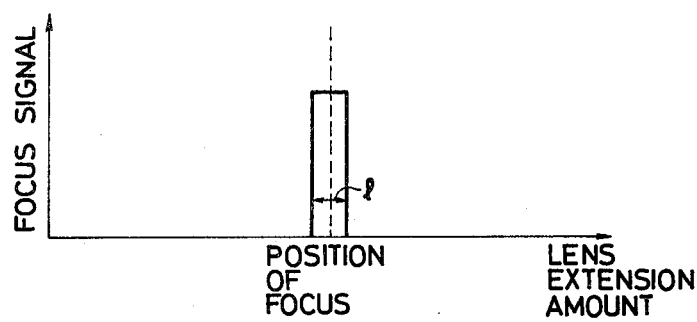
FIGS. 1A and 1B are graphical representations relating to the generation of a focus signal in an automatic focus indicating device used with the invention.
Figure 1B:
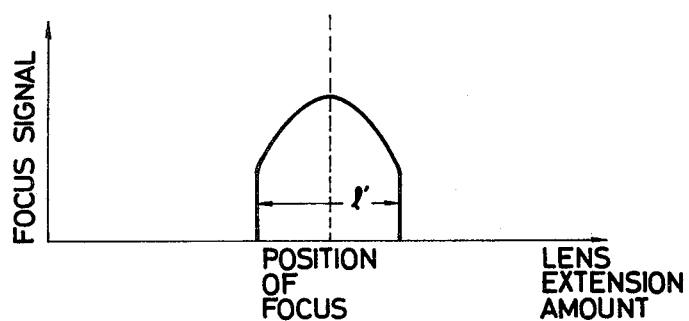

The invention will be described with reference to the accompanying drawings. FIGS. 1A and 1B are graphical representations showing the generation of a focus signal in an automatic focus indicating device. More specifically, FIG. 1A illustrates the generation of a focus signal according to a conventional technique. That is, the focalization signal is generated as a digital pulse when the photographing lens is in a relatively narrow range 1 which extends on both sides of the focus position. On the other hand, with the invention, the focus signal is generated in a relatively wide range 1' extending on both sides of the focus position. Also, with the invention, the focus signal is varied so that it has its maximum value when the photographing lens is at the focus position.

Figure 2:
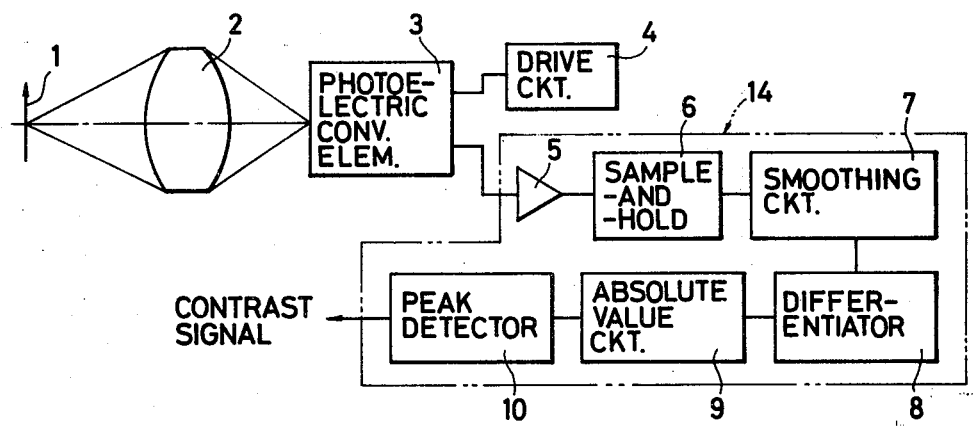
FIG. 2 shows a first embodiment in block diagram form of an automatic focus indicating device of the invention.
Figure 3:
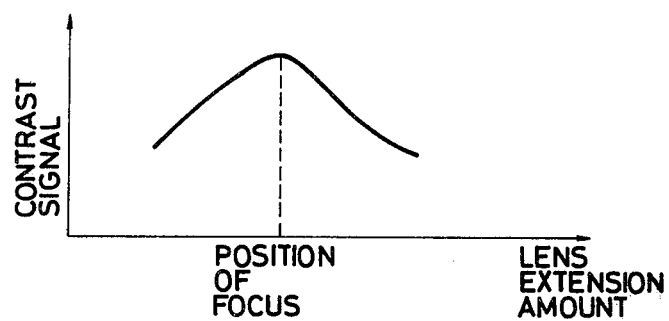
FIG. 3 is a graph of the contrast signal in the circuit of the invention plotted against the lens position.

A preferred embodiment of the invention will be described with respect to a contrast detection type focus detecting device. FIG. 2 illustrates an example of a device in which a contrast signal is obtained from the image of an object to be photographed. The image of an object 1 to be photographed is formed on a self-scanning type photoelectric conversion element 3 by a photographing lens 2. The self-scanning type photoelectric conversion element 3 is made up of plural photoelectric conversion elements and a scanning circuit. In the element 3, the brightness distribution of an object's image is electrically scanned so as to provide a time-series signal which corresponds to the brightness distribution. The self-scanning type photoelectric conversion element 3 is driven by a drive circuit 4 including a scanning pulse generating circuit so as to thereby generate a discrete time-series waveform corresponding to the brightness distribution of an object's image. The waveform, after being amplified by an amplifier circuit 5, is converted into an analog waveform by a sample-and-hold circuit 6. The analog waveform thus obtained is applied to a smoothing circuit 7 where unwanted high frequency components are removed from the analog waveform. As a result, a waveform corresponding to the original brightness distribution of the object's image is outputted by the smoothing circuit 7. The output waveform of the smoothing circuit 7 is differentiated by a differentiation circuit 8 as a result of which a differentiation signal representative of the high spatial frequency of the image, that is, the slope of the brightness distribution, is provided. The differentiation signal is converted into a positive or negative voltage waveform by an absolute value circuit 9. The peak value of the output absolute values which are provided by the absolute value circuit 9 for each scanning period is detected by a peak value detecting circuit 10 and is held until the next peak value is detected in the following scanning period. The peak values thus obtained form the aforementioned contrast signal. The contrast signal has its maximum value (amplitude) at the position of focus, that is, when the photographing lens is at the focus position, as shown in FIG. 3.

Figure 4:
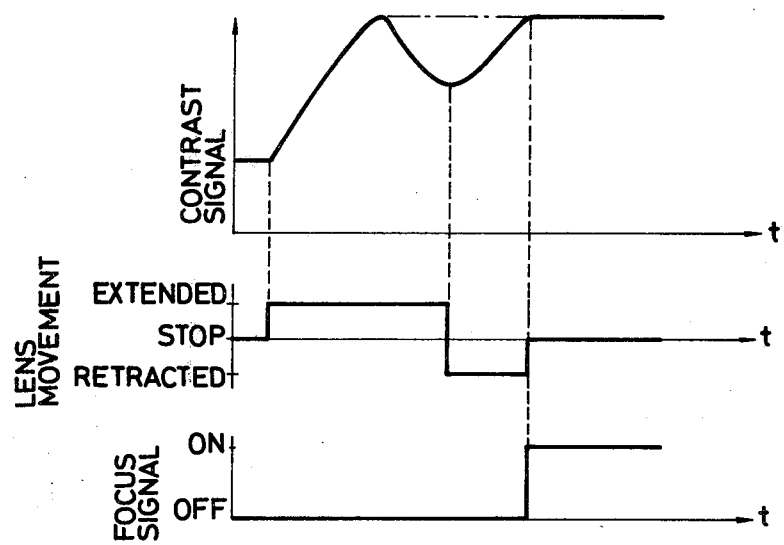
FIG. 4 is a series of waveforms indicating the various stages of movement of the photographing lens.

The focus signal which, as shown in FIG. 1A, varies in a digital mode at the focus position, can be provided by using the focus signal according to a technique in which the maximum value of the contrast signal is stored once and, when the contrast signal again reaches the value thus stored, a coincidence signal is produced. FIG. 4 is a diagram for a description of this method. More specifically, the upper part of FIG. 4 shows variations of the contrast signal while the middle part of FIG. 4 indicates the movements of the photographing lens, extention, retraction and stop. The two parts of FIG. 4 illustrate the case when the lens initially maintained at a stopped position is extended and, when the contrast signal reaches the maximum value, the lens is retracted, and when the contrast signal again exhibits the maximum value, the lens is stopped. The first maximum value of the contrast signal is stored (peak hold) and the contrast signal is compared with the maximum value thus stored. When the two are equal, the aforementioned focus signal is produced. Indicated by the dot-dash line in the upper part of FIG. 4 is the peak level held. The lower part of FIG. 4 indicates that when the peak level held coincides with the contrast signal, the focus signal is produced. A light emitting element can be turned on in a digital mode using the focus signal.

Figure 5:
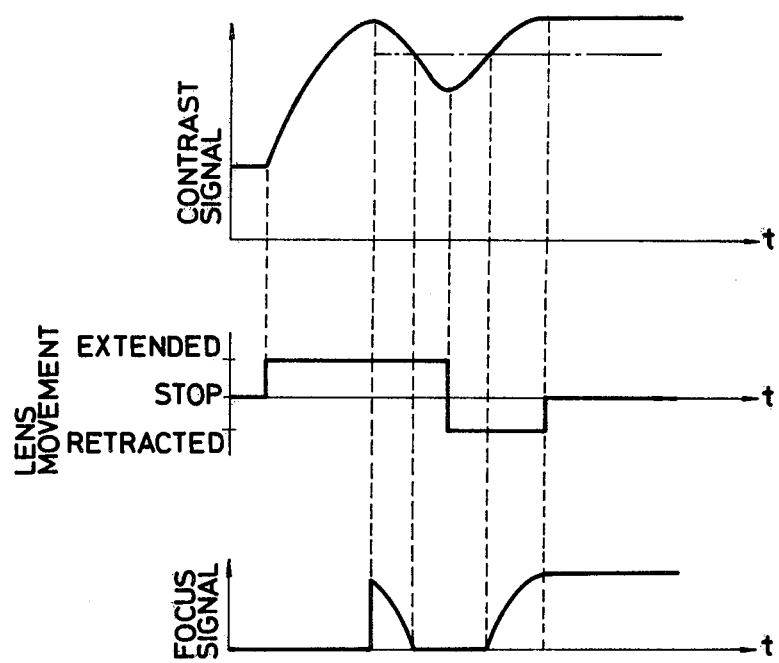
FIG. 5 is a graphical representation for explaining how the focus signal is produced in accordance with the invention.

The present invention can be implemented using the contrast signal described above. FIG. 5 illustrates how the focus signal is produced in accordance with the invention. More specifically, the upper part of FIG. 5 shows variations of the contrast signal while the middle part of FIG. 5 shows the movements of the photographing lens similar to the case of FIG. 4. The photographing lens is stopped when the contrast signal is at its maximum value as in the case of FIG. 4. However, it should be noted that, when the contrast signal reaches its maximum value, a value lower than the maximum value is stored. The contrast signal is compared with the voltage division peak value thus stored and, when the contrast signal is larger than the value, the focus signal is produced. If a circuit is constructed such that the focus signal is varied according to the difference between the contrast signal and the value stored, the focus signal can be extracted. The lower part of FIG. 5 shows the focus signal thus produced.

Figure 6:
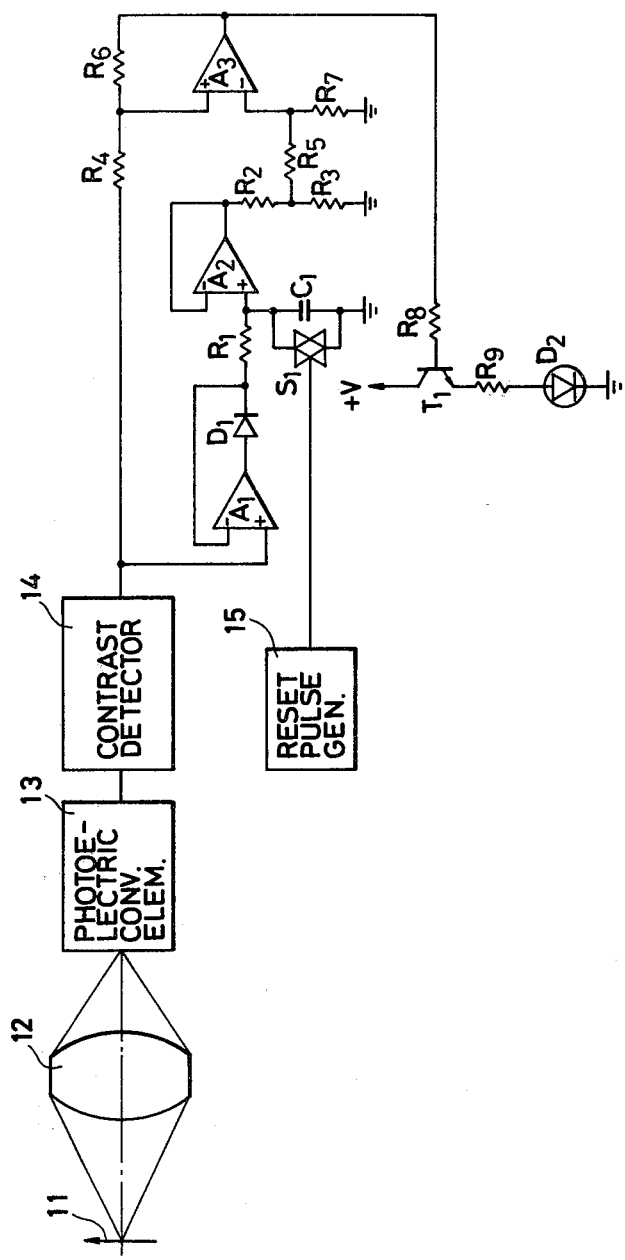
FIG. 6 shows a second embodiment in block diagram form of an automatic focus indicating device of the invention.

An example of an automatic focus indicating device according to the invention is shown in FIG. 6. The image of an object 11 to be photographed is formed on a contrast detecting photoelectric conversion element 13 in a similar fashion to that described with reference to FIG. 2 by a photographing lens 12. The output of the element 13 is applied to a contrast detecting circuit 14 as a result of which a contrast signal is produced at the output of the element 13. The contrast detection system may be a device as shown in FIG. 2. However, it may also be any device which can extract a single contrast signal from the image of an object to be photographed.

The peak value of the contrast signal is detected by a peak hold circuit composed of an operational amplifier $A_1$, a diode $D_1$, a resistor $R_1$, and a capacitor $C_1$. The output peak hold signal of the peak hold circuit, after passing through a buffer amplifier, implemented as an operational amplifier $A_2$, is subjected to voltage division by resistors $R_2$ and $R_3$ and the difference between the next following contrast signal and the voltage division peak value is extracted by a differential amplifier composed of an operational amplifier $A_3$. The output of the differential amplifier is a control signal which, when the contrast signal is higher than the voltage division peak value, renders a transistor $T_1$ conductive. As the differential output of the differential amplifier increases, current flowing between the collector and the emitter of the transistor $T_1$ is increased. When the transistor $T_1$ is rendered conductive, current flows in a light emitting diode $D_2$ turning it on.

The peak value is stored in the capacitor $C_1$. The capacitor $C_1$ is discharged by operation of an analog switch $S_1$ which is controlled by a reset pulse from a reset pulse generating circuit 15 whereby the peak hold signal is reset. This resetting operation is required before the image of another object is focused. The reset pulse may be generated in association with the operation of the shutter button at the time of shutter release. Thus, the light emitting element is turned on when the photographing lens is substantially at the focus position and the brightness of the light emitting element increases to its maximum value at the position of focus.

Another example of the automatic focus indicating device according to the invention, in which focus is indicated by a sound signal, will be described with reference to FIGS. 7 and 8.

Figure 7:
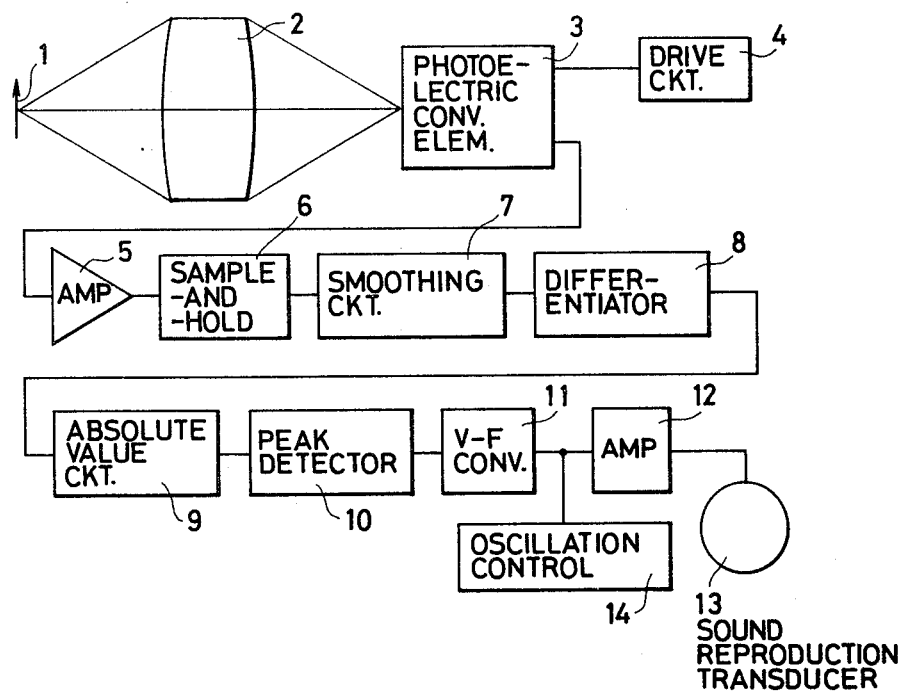
FIG. 7 shows a third embodiment in block diagram form of an automatic focus indicating device for a camera of the invention.
Figure 8:
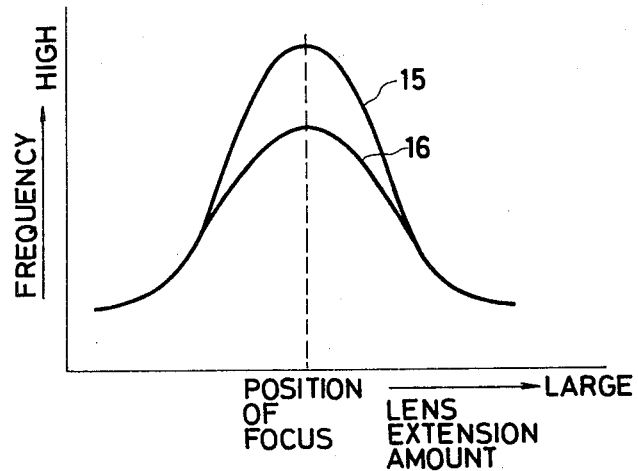
FIG. 8 is a graphical representation showing the frequency of the indication signal produced plotted against the contrast of the object being viewed.

The device as shown in FIG. 7 includes a so-called "V-F converter" 11 for converting voltage variations into frequency variations and an amplifier circuit connected to the V-F converter 11. As the voltage value held by a peak value detecting circuit 10 increases, the frequency of sound produced by a sound producing transducer 13 increases. That is, the frequency of the sound produced is in proportion to the voltage value held by the circuit 10. If an oscillation control circuit 14 is inserted between the V-F converter 11 and the amplifier 12, it is then possible to cause the sound producing element to produce a sound signal intermittently or a variety of sound signals of different tone color. In the case of a focus indicating device utilizing the variations in amplitude of sound, the peak value detecting circuit 10 is connected to an oscillation circuit which is in turn connected to an amplifier circuit so that the amplification factor of the amplifier circuit is controlled by the output of the peak value detecting circuit.

The operation of the device shown in FIG. 7 will be described in more detail with reference to FIG. 8. While observing the edge part of the brightness distribution of an object within the measuring field frame of the view finder, the photographer extends or retracts the photographing lens 2. When during this operation the lens 2 is at the focus position, the frequency of sound produced by the sound producing element is at its highest as shown in FIG. 8. The frequency is varied as indicated by the curve 15 when the contrast of the object is high while the frequency is varied as indicated by the curve 16 when the contrast of the object is low. That is, the higher the contrast of the object, the greater the variation of the frequency of sound produced by the sound producing element. This means that, as the contrast of an object is increased, the lens can be readily focused on the object. However, the lens can also be focused on an object whose contrast is low because the frequency of sound produced by the sound producing element becomes highest at the point of focus. This is a specific advantageous feature of the focus indicating device of the invention utilizing a sound signal which is produced at the position of focus.

As is clear from the above description, in the device according to the invention, the light emitting element is turned on at the position of focus and the focus signal has its maximum value at the position of correct focus. Furthermore, the focus indicating signal provided gives a clear indication to a photographer even when the camera is held by hand and yet the focus indicating signal is very high in its indication accuracy when the camera is fixedly held.

In addition, the lens can be accurately focused on an object merely by detecting the maximum value of the frequency of sound generated by the sound producing transducer. Therefore, a camera using the focus indicating device of the invention is free from the conventional troublesome focusing operation. Since the edge part of the brightness distribution of an object is detected, the lens can be focused even on a deep object. The sound producing element may be a piezo-electric buzzer which occupies only a little space or an earphone.

In the device shown in FIG. 7, the contrast signal is converted directly into the sound signal so that focus is detected from the variations of the sound signal. That is, the device is an audible focus indicating device. It goes without saying that the audible focus indicating device can be effectively combined with a variety of visual focus indicating means such as for instance a light emitting diode. Moreover, although the sound producing circuit described above produces a sound of maximum frequency at the point of focus, a minimum or zero frequency can be used as well.

In the case where no further focus is required as in the case where the same object is repeatedly photographed, the sound signal produced by the sound producing element may annoy the photographer. In such a case, the sound may be shut off. Accordingly, a combination of the audible focus indicating device and the visual focus indicating means is quite advantageous.

What is claimed is:

1. A focus indicating device for a camera of the type including a photoelectric detection means for providing a focus signal corresponding to the degree of focus of said camera, said focus signal having a peak value when said camera is substantially in-focus, said device comprising:

means for generating from said focus signal a threshold signal having a value lower than said peak value;

means for comparing said focus signal with said threshold signal and for providing a focus detection output signal when said focus signal exceeds said threshold signal, to thereby provide a coarse indication that the focus condition of said camera is within a predetermined range of the in-focus condition, the value of said focus detection output signal varying in accordance with the difference between said focus signal and said threshold signal to thereby provide a fine indication that said camera is substantially in-focus; and indicating means responsive to said focus detection signal for providing an indication of the focus condition of said camera, said indication varying in accordance with the value of said focus detection output signal.

2. A focus indicating device as defined in claim 1, wherein said means for generating comprises:

means for receiving said focus signal and providing a peak value signal corresponding to the highest value of said focus signal during a focusing operation; and means for voltage dividing said peak value signal, said divided peak value signal comprising said threshold signal.

3. A focus indicating device as defined in either of claim 1 or 2, wherein said indication is visual and the intensity of said indication varies in accordance with the value of said focus detection signal.

4. A focus indicating device as defined in either of claims 1 or 2, wherein said indication means comprises:

circuit means for converting output variations of said focus detection signal into frequency variations; and sound producing means operating in response to said circuit means for producing a sound the frequency of which varies in accordance with the value of said focus detection signal and has a peak value at the substantially in-focus condition of said camera.

* * * * *